United States Patent [19]

Warke

[11] Patent Number: 5,398,767

[45] Date of Patent: Mar. 21, 1995

[54] GROUND TREATMENT APPARATUS

[76] Inventor: William L. Warke, 41 Mountsandel Road, Coleraine, County Londonberry, BT52, 1JE, United Kingdom

[21] Appl. No.: 51,938

[22] Filed: Apr. 26, 1993

Related U.S. Application Data

[63] Continuation-in-part of Ser. No. 742,738, Aug. 6, 1991, abandoned, which is a continuation of Ser. No. 469,541, Mar. 19, 1990, abandoned.

[30] Foreign Application Priority Data

Jun. 22, 1988 [GB] United Kingdom ............ 8814861
Jan. 20, 1989 [GB] United Kingdom ............ 8901260

[51] Int. Cl.⁶ ............................................. A01B 45/02
[52] U.S. Cl. ........................................ 172/21; 172/42; 172/95; 172/97; 172/125
[58] Field of Search .................. 172/21, 22, 42, 95, 172/97, 99, 101, 123, 125

[56] References Cited

U.S. PATENT DOCUMENTS

| | | | |
|---|---|---|---|
| 2,517,733 | 8/1950 | Takats | 172/42 X |
| 2,638,831 | 5/1953 | Ferguson et al. | 172/22 |
| 2,800,066 | 7/1957 | Cohrs et al. | 172/22 |
| 3,204,703 | 9/1965 | Hansen | 172/42 X |
| 3,802,513 | 4/1974 | Ploenges | 172/21 |
| 3,803,659 | 4/1974 | Sawatzky | 172/21 X |
| 3,878,899 | 4/1975 | Jones | 172/21 |
| 3,926,131 | 12/1975 | Collins | 172/21 X |
| 3,977,476 | 8/1976 | Van Der Lely | 172/123 X |
| 4,178,860 | 12/1979 | Hines et al. | 172/21 X |
| 4,351,201 | 9/1982 | Link | 74/598 |
| 4,658,909 | 4/1987 | McDermott et al. | 172/22 |
| 4,662,456 | 5/1987 | Classen | 172/22 |
| 4,750,565 | 6/1988 | Hansen et al. | 172/22 |
| 4,867,244 | 9/1989 | Cozine et al. | 172/22 |

FOREIGN PATENT DOCUMENTS

| | | | |
|---|---|---|---|
| 18639 | 8/1910 | Spain | 403/393 |
| 1347967 | 2/1974 | United Kingdom | 172/21 |
| 2147482 | 5/1985 | United Kingdom | 172/125 |

Primary Examiner—Dennis L. Taylor
Assistant Examiner—John A. Ricci
Attorney, Agent, or Firm—Nikaido, Marmelstein, Murray & Oram

[57] ABSTRACT

A lawn treatment apparatus includes an open-bottomed support body having three treatment implements in the form of spiking devices or brushing/sweeping devices adapted to move through the open bottom. The support body carries a driving mechanism to drive the treatment implements with a combination of vertical and horizontal oscillations. A biasing mechanism is provided normally to hold the implement in a vertical attitude or substantially so when stationary.

25 Claims, 6 Drawing Sheets

GROUND TREATMENT APPARATUS

This application is a continuation-in-part of patent application Ser. No. 07/742,738, filed Aug. 6, 1991, now abandoned, which was a continuation of grandparent application Ser. No. 07/469,541, filed on Mar. 19, 1990, now abandoned.

This invention relates to ground treatment apparatus and particularly to an aerator.

Grass and particularly lawn aeration is a well known technique for improving the quality of a lawn and is achieved by spiking the lawn to a desired depth (usually about 15 cm) with a determined number of spike holes to the square meter. Spiking can be achieved by a simple manual or pedal spiking tool e.g. a tool having an array of spikes (which can be solid or tubular prongs) pushed into the ground, or a more involved multiprong rotary arrangement having a cylindrical body from which extend radial solid prongs with the rotary arrangement being pushed across the ground, or a more sophisticated crank-driven apparatus such as that described in U.S. Pat. No. 4,645,012 (Ryan). The simple tool is slow and laborious to use if large areas are to be covered. The rotary arrangement is quicker to use however it suffers from the disadvantage of pulling up or tearing the lawn as each prong exits and is limited as to how close a hole pattern can be achieved. While this may not be important in a domestic garden context, it is not acceptable in a commercial environment such as a golf course. The apparatus suffers from the disadvantage that it imparts a vertical action to the implement however no horizontal motion is imparted and therefore the implement does not enter and exit the ground vertically giving rise to slight tearing or elongating of the holes. The design of the apparatus also having only two crank arms cannot achieve a close hole pattern without overloading each arm with tines. The crankshaft construction of these apparatus are either of such that multi-arm arrangements are difficult and expensive or are of a solid one piece construction necessitating the use of split or shall bearings which require daily greasing or an expensive oil pump lubrication system.

It is an object of the present invention to obviate or mitigate the aforesaid disadvantages.

Accordingly, the present invention is a ground treatment apparatus, comprising:

a support body having an open bottom;

at least one treatment implement supported by said support body and being movable through said open bottom of said support body, said at least one treatment implement having an implement head extending vertically;

driving means carried by said support body for driving said treatment implement in a cyclical path relative to said support body, said cyclical path including both vertical and horizontal movement; said driving means including: (a) a connecting link having a first end and a second end, said first end being pivotably connected to said support body; (b) an arm lever having a central portion, a first end pivotably connected to said second end of said connecting link, and a second end connected to said at least one treatment implement; (c) a drive mechanism pivotably connected to said central portion of said arm lever for cyclically driving said arm lever in a substantially circular motion; and biasing means for biasing said implement to a substantially vertical disposition when said implement is stationary with respect to said support body.

Preferably, the treatment implement is a ground spiking device.

A plurality of treatment implements are desirably provided in a lateral array. The treatment implements preferably are mounted on the driving means out of phase with each other.

Preferably also, the driving means comprises a drive mechanism and a series of arm levers carried thereon to impart combined vertical and horizontal oscillations to the implements.

Power means is preferably provided to operate the driving means.

The support body is desirably rectangular in plan and is preferably supported off the ground by ground-engaging support arrangements desirably at the leading and trailing ends, respectively, of the support body. The support arrangements are desirably mounted on the body in an adjustable manner whereby the body is tiltable from a first position whereat the spiking devices can penetrate the ground, to a second position whereat all of the spiking devices are precluded from engaging the ground.

By virtue of the horizontal oscillations of the devices, the apparatus can be propelled by the reaction of the devices with the ground. Alternatively, the support arrangements are wheel arrangements and a transmission drive is provided from the drive mechanism to operate the wheel arrangements at the trailing end of the body.

Preferably also, the drive mechanism, on rotation, imparts eccentric motion to the levers. The drive mechanism is preferably a crankshaft having a series of crank pins.

The crankshaft is preferably assembled from similar cylindrical segments bolted together, and the centre line segments of the crankshaft each are provided with a rabbet to receive an adjoining crank pin. The axes of the crank pins are desirably out of phase with each other.

Preferably further, two clutch mechanisms are provided to permit different spiking patterns to be selected for use. Control means are desirably provided to enable one or other of the clutch mechanisms to be selected.

Embodiments of the present invention will now be described, by way of example, with reference to the accompanying schematic drawings, in which.

Referring to FIGS. 1 to 9 of the drawings, in general to all embodiments, a ground treatment apparatus is a lawn spiking aerator comprising an open-bottomed support body 10 with two or more treatment implements in the form of spiking devices 12 adapted to move through the open bottom. Means are carried by the support body 10 for driving the devices 12 in a cyclical path relative to said support body and including both vertical and horizontal oscillatory movement with biasing means 14 normally to hold the devices 12 in a vertical attitude or substantially so when stationary.

Figure 9:
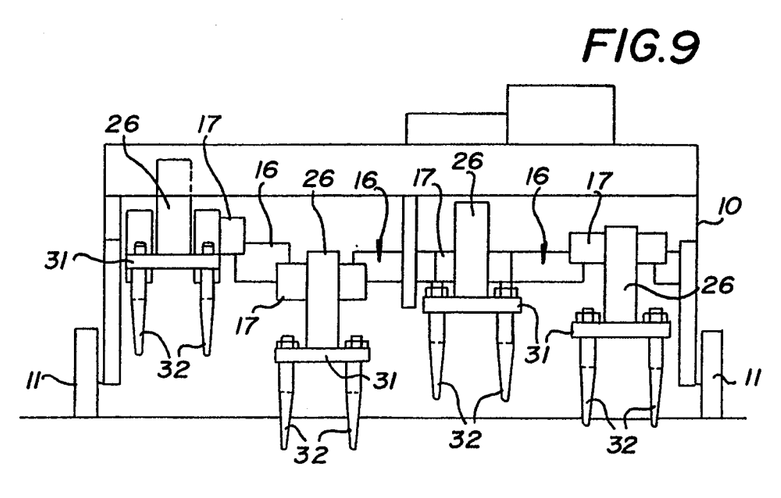
FIG. 9 is a rear view of an apparatus as shown in FIGS. 1, 2 or 3 showing a lateral array of spiking devices.

Four spiking devices 12 as shown in FIG. 9 are provided in a lateral array. The spiking devices 12 are mounted on the drive means out of phase with each other.

The driving means comprises a drive mechanism 16 and a series of arm levers 18 carried thereon each to impart the combined vertical and horizontal oscillatory movement to the respective devices 12. The drive mechanism 16, on rotation, imparts eccentric motion to the levers 18. The drive mechanism 16 is a crankshaft having a series, equal in number to the number of arm levers 18, of crank pins.

Figure 6A:
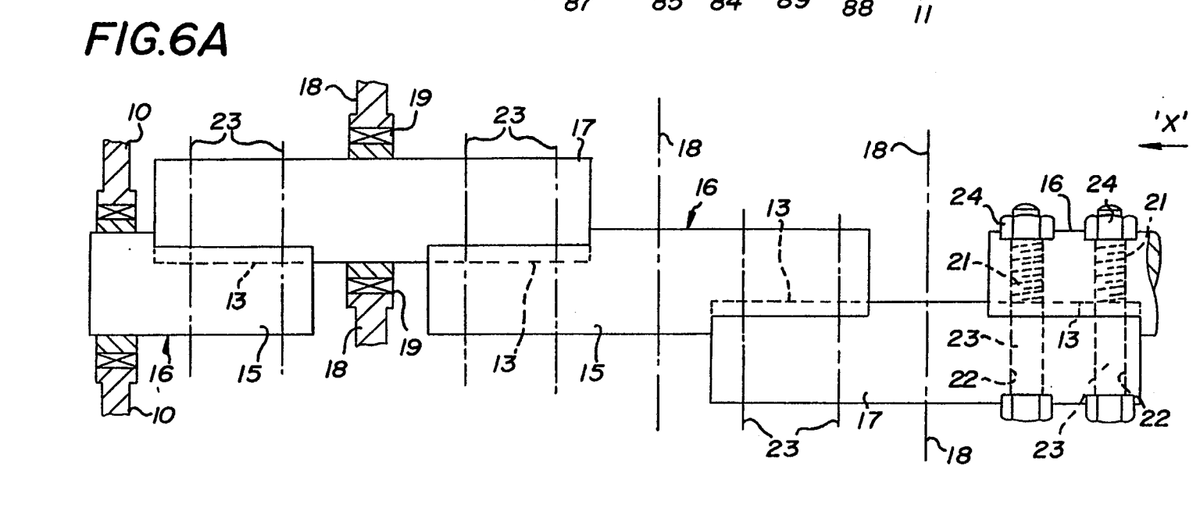
FIGS. 6A and 6B are respectively a front elevational view and an end view in the direction 'X' of FIG. 6A of a crankshaft according to the present invention.
Figure 6B:
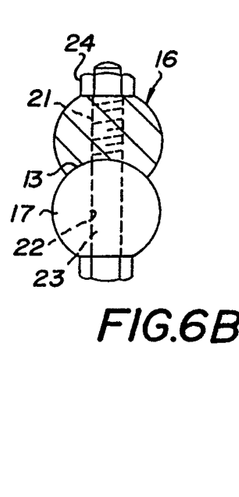
Figure 7A:
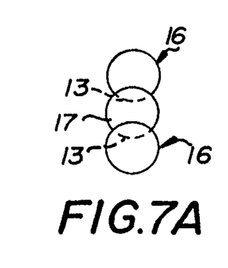
FIGS. 7A, 7B, 7C, 7D, and 7E are respectively end views of a crankshaft to a smaller scale than used in FIG. 6 showing the different out of phase sequences for two, three, four, five and six crank pins.
Figure 7B:
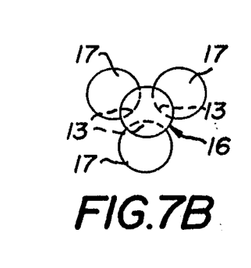
Figure 7C:
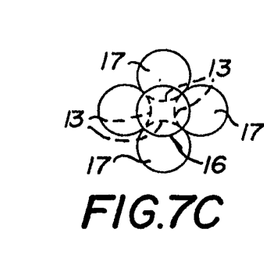
Figure 7D:
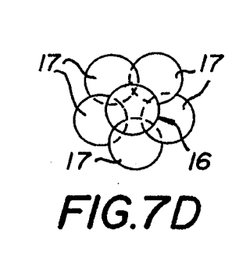
Figure 7E:
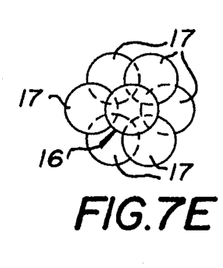

The crankshaft 16 is assembled from similar cylindrical segments 15 bolted together. The centre line segments 15 of the crankshaft 16 are each provided with an arcuate rabbet 13 as shown in FIGS. 7A–7E to receive an adjoining crank pin 17. The axes of the crank pins 17 are out of phase with each other as shown in FIGS. 7A–7E. Tapped bores 21 are provided in the segments 15 of the crankshaft 16 and straight bores 22 of the crank pins 17. Bolts 23 and locking nuts 24 are provided for engagement through each aligned tapped bore 21 and straight bore 22 with the bolt head on the outside of the crank pin 17 and the thread of the bolt 23 engaging the thread of the tapped bore 21 with the locking nut 24 tightened on the outer end of the bolt 23 extending through the segment 15 of the crankshaft 16 (only two bolts and nuts are shown in FIG. 6A with the location of the others indicated only by a centre line). Alternatively, socket head cap screws (not shown) can be used with the head being flush with the circumference of the crank pin. A fine screw thread can be used to prevent the bolt vibrating loose elliminating the need for a locking nut. The levers 18 are each pivotally mounted at a central portion thereof through a bearing 19 on a crank pin 17 with the forward end pivotally connected to a second end of a connection link 20 otherwise pivotally connected at the first end to an anchorage 25 on the body 10. The rearward end of each lever 18 carries an implement head 26. An anchorage 27 is provided on the upper side of each lever 18 for connection of one end of the biasing means 14 in the form of a spring plunger 28. A pivotal anchorage 29 is provided on the head 26 adjacent to its top as shown for connection by the other end of the plunger 14. The bottom of the head 26 carries a spiking device 12 comprising a holder 31 having two spaced tines 32 depending therefrom. The tines 32 are hollow tubes.

The support body 10 is a casing and is substantially rectangular in plan and is supported off the ground by four wheel arrangements 11, two each at the leading and trailing ends thereof. The wheel arrangements 11 are mounted on the body 10 in an adjustable manner whereby the body 11 is tiltable from a first position whereat the spiking devices 12 can penetrate the ground, to a second position whereat all of the spiking devices 12 are precluded from engaging the ground.

Power means in the form of an engine 30 is provided together with a power transmission arrangement to operate the drive means. The power transmission arrangement comprises an engine pulley wheel 33 connected through a pulley belt 34 to a drive pulley wheel 35 on a drive shaft 36. A jockey pulley wheel 37 is provided to tension the belt 34. The jockey pulley wheel 37 is pivotally mounted on an arm (indicated by centre line) 38 (FIG. 1) pivotally mounted on a mounting 39 upstanding from the body 10 and tension controlled manually by a Bowden cable (not shown) secured at 43 on arm 38 and passed through a fixing point 44 on upstand 45 and then to near the top of an operating handle 46. The operating handle 46 is mounted on the body 10 on a block 48 fixed to a plate 47 secured to the body 10 through anti-vibration mountings 47A of, for example rubber. The drive shaft 36 fixedly carries a drive sprocket wheel 40 and the crankshaft 16 fixedly carries a sprocket wheel 42 around both of which wheels 40, 42 a meshing chain 41 is entrained.

Means to move the rear wheel arrangements 11 from the second position to the first position to bring the spiking devices into ground contact is provided and comprises a lift bar 50 mounted on the plate 47 and an elongate handle 51 which extends through the body 10 to be pivotally connected to a top of a beam 52 forwardly uniting two laterally mounted brackets 53 pivoted on cross shaft 55 and carrying rearwardly an axle 99 mounting the rear two wheel arrangements 11. The lift bar 50 and the handle 51 are connected together through a locking mechanism 54. The locking mechanism 54 is secured to the bar 50 and has a transverse pin 56 engagable in a transverse groove 57 provided in the handle 51. The handle 51 is biased downwardly to normally retain the pin 56 in the groove 57. The biasing mechanism comprises a toggle 61 pivoted in the locking mechanism, the forward end of which has a spring 62 bearing on it, and the rearward end of which has a roller 63 in contact with the handle 51. In this position, the rear wheel arrangements 11 are lowered and the spiking devices 12 lifted away from the ground i.e. the second position relative to ground surface 'A'. By a deliberate upward movement of the handle 51, the pin 56 is released from the groove 57 and the handle 51 can be moved axially downwardly until the pin 56 abuts stop face 58 of a downward projection 59 provided on the handle 51. This downward movement causes the beam 52 to move downwardly to raise the wheel arrangements 11 and allow the spiking devices 12 to be ground engaging i.e. the first position relative to ground surface 'B'.

Figure 1:
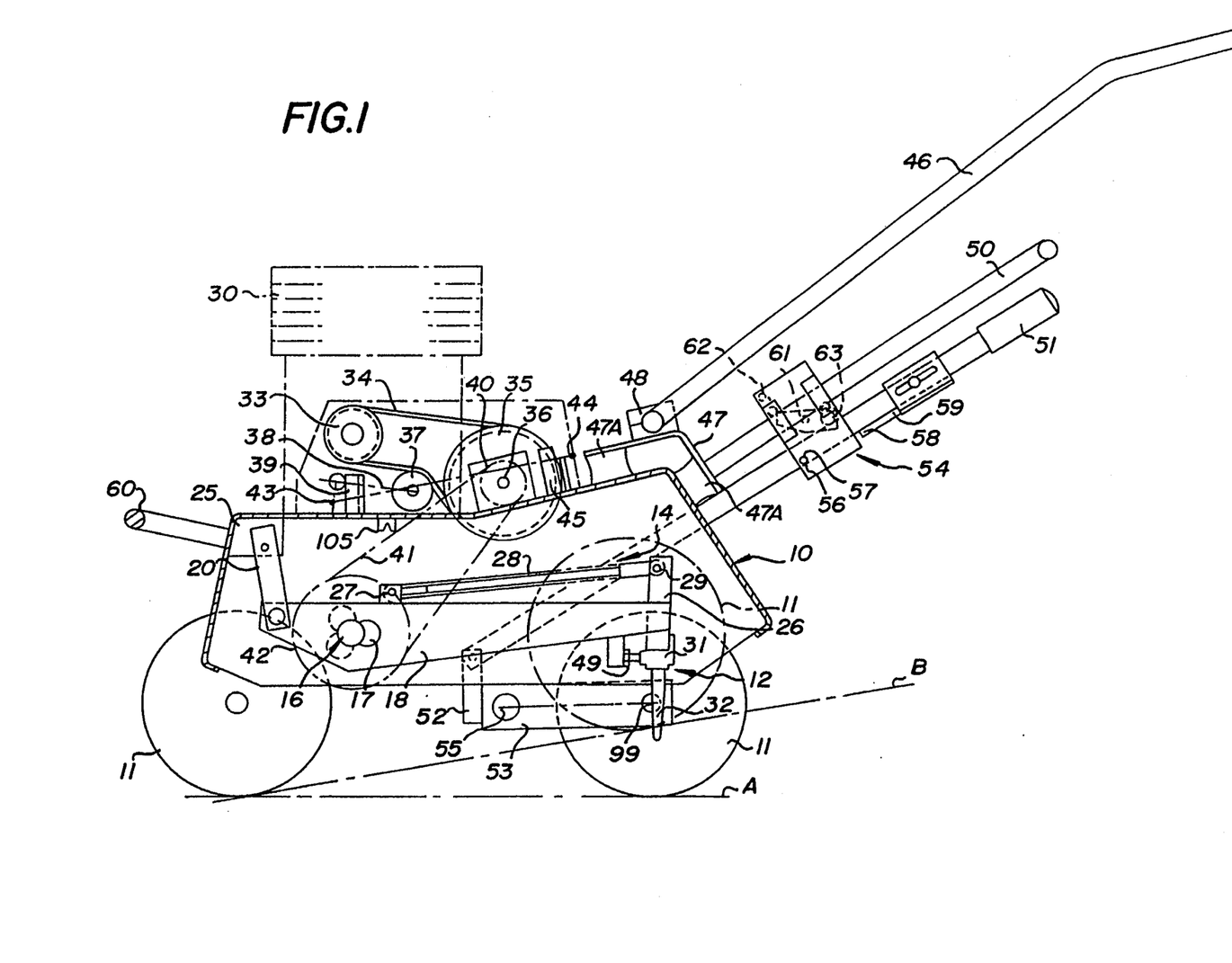
FIG. 1 is a side elevational view of a ground treatment apparatus according to a first embodiment of the present invention with the nearest lateral side of a support body cut-away for clarity.

In the first embodiment as shown in FIG. 1, the apparatus shown is of a pedestrian operated power driven type with the wheel arrangements 11 all being low friction rotatable. The plunger 28 is of a single acting type and a limit stop 49 is provided to prevent pivotal movement of the spiking device 12 other than by compression of the plunger 28.

A 'U' support bar 60, as shown in FIG. 1, is provided extending from the front side of the body 10, with the web thereof parallel to the front side, to support the apparatus uprightly when tipped over about its front wheel arrangements 11.

By virtue of the horizontal oscillations of the devices 12, the apparatus of this embodiment is propelled by the reaction of the devices 12 with the ground.

In use of this embodiment, the engine 30 once started transfers power through the power transmission arrangement to the crankshaft 16 to cause the arm levers 18 to move to impart vertical and horizontal oscillations to the spiking devices 12. With the handle 51 is in its first position, the tines 32 of the spiking devices enter the ground in the phased sequence. The plugs of earth punched out by the tines entering the ground progressively pass up the inside of the tines and exit from the open top thereof to fall onto the ground for subsequent collection. When the apparatus has completed a run, the apparatus is manouvered into a second run or the spiking devices can be moved into the second position, manouvered round and then into the first position.

Figure 2:
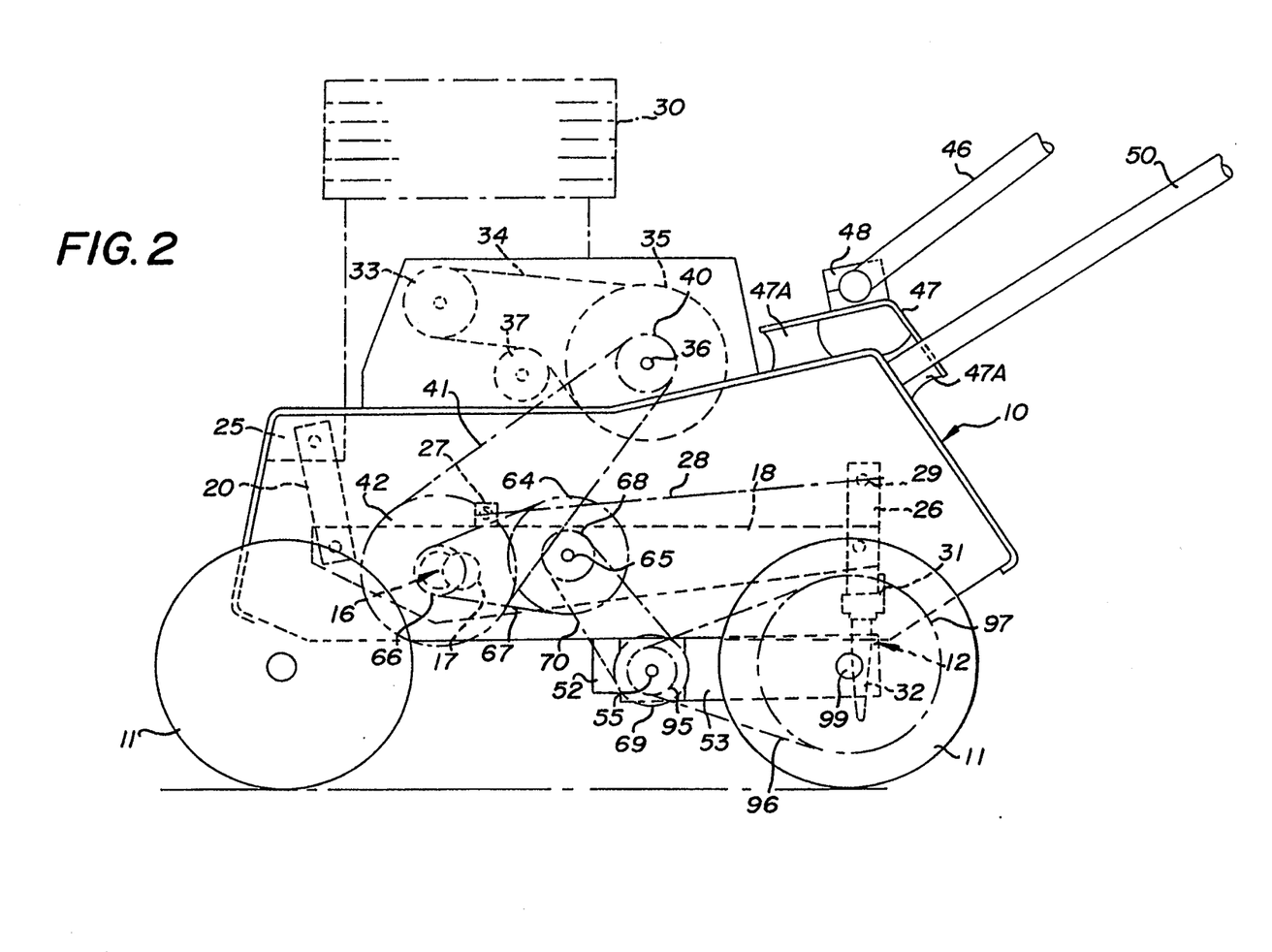
FIG. 2 is a side elevational view of a ground treatment apparatus according to a second embodiment with the nearest lateral side cut-away for clarity and some components common with the first embodiment being omitted for clarity.

In a second embodiment as shown in FIG. 2, a pedestrian operated driven type of apparatus is provided. This embodiment is similiar to that of FIG. 1 except that a transmission drive is provided. A sprocket wheel 64 is mounted on an intermediate shaft 65 parallel to and above the cross shaft 55. A smaller sprocket wheel 66 is fast on the crankshaft 16 and a chain 67 is entrained around sprocket wheels 64 and 66. The intermediate shaft 65 also mounts a smaller sprocket wheel 68 and the cross shaft 55 fixedly carries a sprocket wheel 69. A chain 70 is entrained around sprocket wheels 68 and 69. A second sprocket wheel 95 is attached to each end of the cross shaft 55 via a roller clutch arrangement. This allows sprocket wheel 95 on either end of cross shaft 55 to over run cross shaft speed. Hence the driven rear wheel arrangements 11 at that side free wheels enabling it to turn corners. Sprocket wheels 95 are connected through chain 96 to a sprocket wheel 97 on the rear wheel arrangement drive axle 99.

In use, the apparatus is used and operates in much the same way as the apparatus of the first embodiment with the benefit of being driven by the rear wheel arrangements 11 as opposed to being tine driven.

In a third embodiment as shown in FIGS. 3, 4, 5 and 6, a pedestrian operated driven apparatus is shown, the apparatus having a differential drive mechanism enabling it to turn corners without the roller clutch arrangements incorporated in sprocket wheels 95 as described in the second embodiment, the differential gear box 82 has the advantage that drive to both rear wheel arrangements continue when turning corners or operating in an arc. The front wheel arrangements 11 are low friction castor wheels on a common axle 71, the axle 71 being fast with an upright 72 pivotally carried by a nose frame 73 secured to the front of the body 10. The brackets 53 are extended rearwardly and mount a ballast cross beam 74. A 'U' tread bar 75 extends from the beam 74 with the web thereof parallel to the beam 74. The ballast beam 74 is provided to increase the weight to ensure the two rear wheel arrangements 11 stay firmly on the ground even when the head incorporating the spiking device is rising and falling during operation as it will when it strikes stones and hard ground. As well as providing ballast for rear wheel arrangements 11, tread bar 75 when it is stepped on provides assistance to lift bar 50 when raising or lowering the apparatus from second to first positions.

Figures 3, 4:
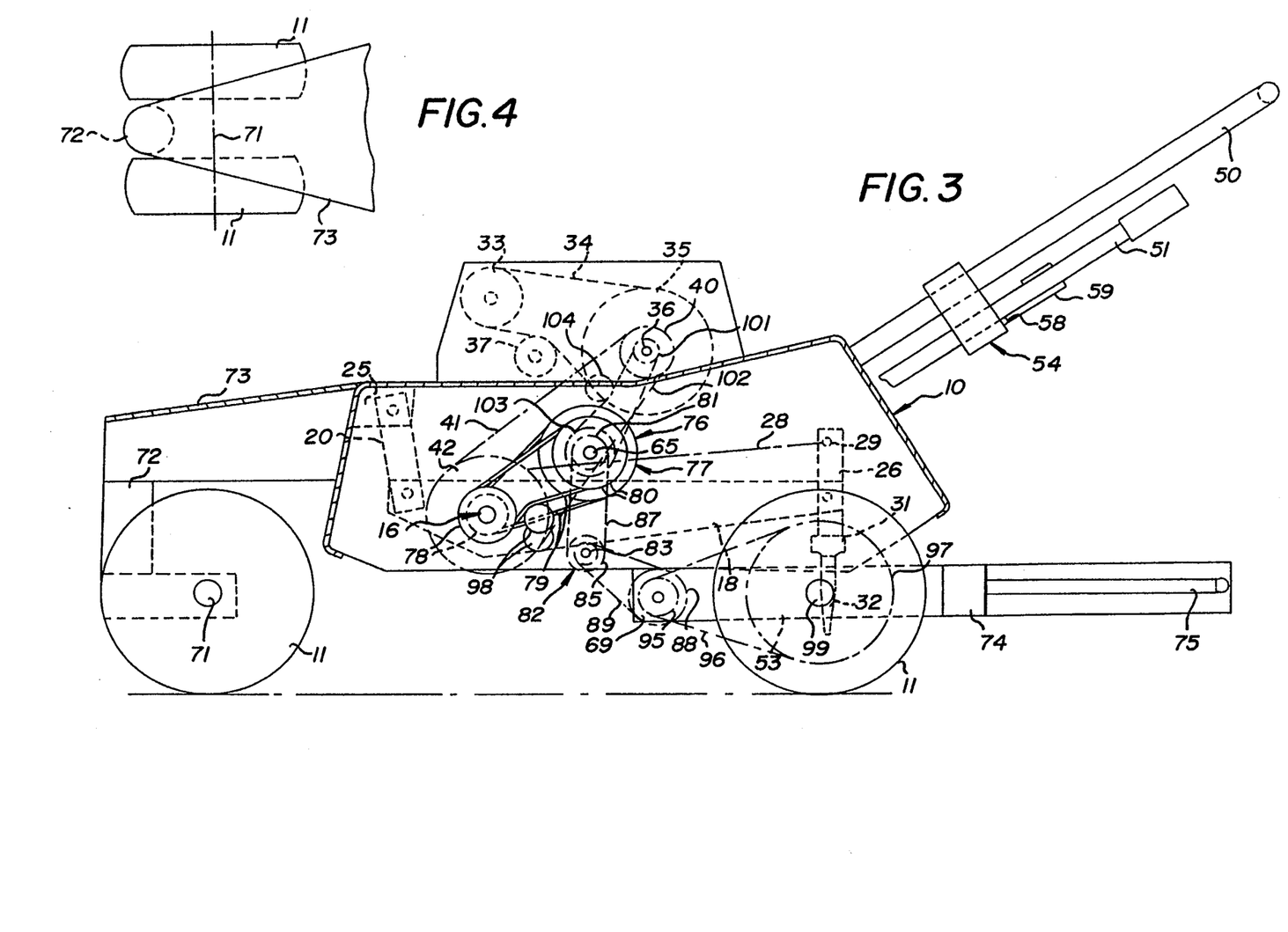
FIG. 3 is a side elevational view of a ground treatment apparatus according to a third embodiment with the nearest lateral side cut-away for clarity and with parts shown in FIGS. 1 and 2 common with this embodiment omitted.
FIG. 4 is a detailed view of a front wheel arrangement of the apparatus shown in FIG. 3.
Figure 5:
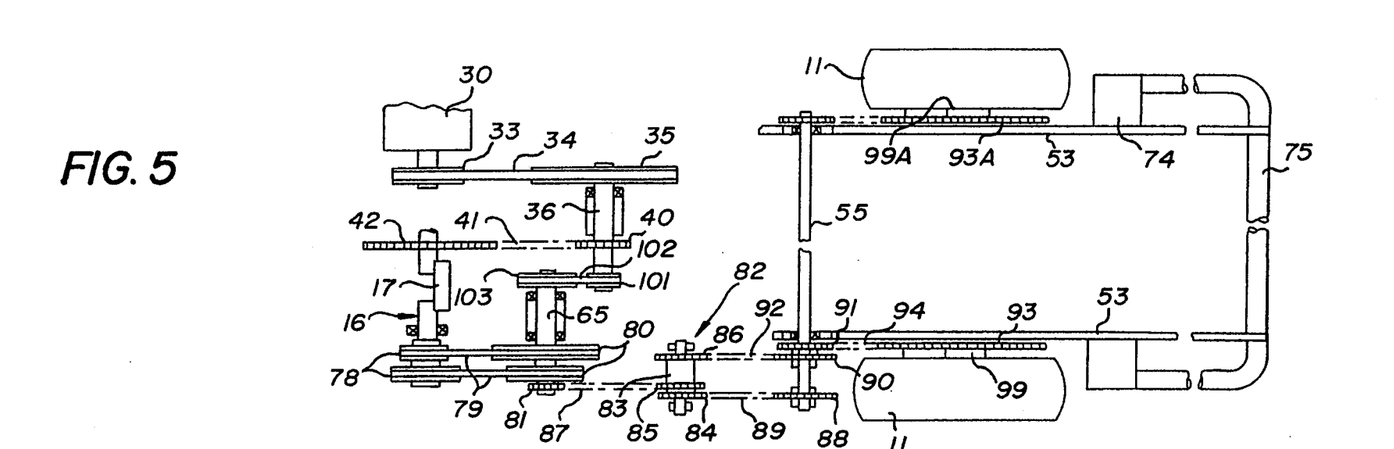
FIG. 5 is a plan view of a power transmission arrangement of the apparatus shown in FIG. 3.

Two clutch mechanisms are provided to permit different spiking patterns of holes per square meter to be selected for use. The clutch mechanisms 76, 77 each comprise two pulley wheels 78, 80 with a belt 79 therearound. Each belt 79 has a jockey wheel 98 to tension the belt 79 and transfer motion from one ground speed to another. A three position lever (not shown) is provided on the operating handle 46 with the three positions representing narrow pattern, neutral and wide pattern. The lever is connected by cable (not shown) to each jockey wheel 98 so to bring one or other or neither into operation. Mechanism 76 relates to a narrow hole pattern and mechanism 77 relates to a wide hole pattern. The pulley wheels 78 on the crankshaft 16 have a roller clutch mechanism to allow them to rotate faster than the crankshaft 16 when a rapid transmission arrangement (to be described hereinafter) is engaged. The pulley wheels 78, 80 are differently diametered as shown to provide faster or slower movement. The crankshaft 16 and shaft 65 are extended out through the lateral side of the body 10 with the wheels 78 mounted on the protruding crankshaft 16 and the wheels 80 mounted on the protruding intermediate shaft 65. At the outer end of the intermediate shaft 65, a sprocket wheel 81 is mounted. A differential gear box 82 is provided having a shaft 83 carrying three sprocket wheels 84, 85, and 86. A chain 87 is entrained around sprocket wheel 81 and sprocket wheel 85. A sprocket wheel 88 is fast with the cross shaft 55 and a chain 89 is entrained around wheel 88 and wheel 84 of the gear box 82. A compound sprocket wheel 90, 91 is also carried on the cross shaft 55 as shown. This wheel 90, 91 rotates on the cross shaft 55. Sprocket wheel 86 of the gear box 82 and sprocket wheel 90 are connected by a chain 92 being entrained around them. The sprocket wheel 91 is connected through chain 94 to sprocket wheel 93 on the stub axle 99 for the rear wheel arrangements 11. A sprocket wheel 93A is also mounted on the stub axle 99A. The compound sprocket wheel 90, 91 transfers motion from the gear box 82 to the sprocket wheel 93 while the sprocket wheel 88 transfers motion from the gear box 82 to the sprocket wheel 93A.

The rapid transport transmission arrangement is provided for use when the spiking devices 12 are in a second position. This transmission comprises a pulley wheel 101 on the drive shaft 36 connected by belt 102 to a pulley wheel 103 on the intermediate shaft 65. A jockey wheel 104 operates to tension the belt 102 to transfer motion from the drive shaft 36 to the rear wheel arrangements 11. The jockey wheel 104 is brought into operation by a lever (not shown) on the operating handle 46 connected by cable to an arm (not shown) mounting the jockey wheel 104. Due to the roller clutch mechanism in the pulley wheels 78, the pulley wheels 78 can move at a greater speed than the crankshaft 16 as described above. This rapid transmission arrangement can override the pattern selection lever in whichever setting it is at.

Figure 8:
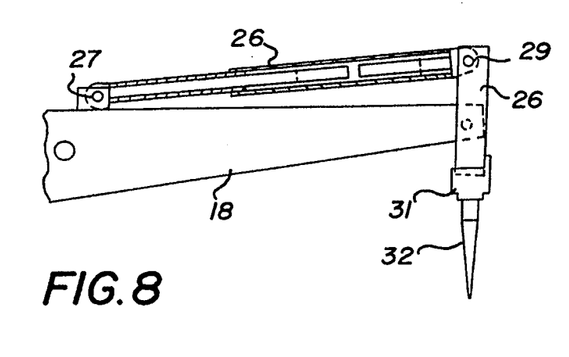
FIG. 8 is a detail of a double acting spring plunger, lever and implement head used in the third embodiment.

In this embodiment, for each lever 18, the limit stop 49 is omitted and the plunger 28 is a double acting spring type which allows the tines to pivot in both directions about its mounting on the lever 18. This double acting spring plunger 28 with the limit stop 49 removed, renders the apparatus non self propelling by reaction of the implements with the ground, leaving all the forward motion dependant on the rear wheel arrangements 11. This is advantageous where multi-aeration patterns are desired by virtue of variable speed ground drives. It is also advantageous when fitted to a tractor mounted apparatus described later where a tractor ground speed may be different to that of the spiking devices.

Two or more different spiking devices 12 can be provided having two or three or more tines respectively, and these can be selected as required with simply interchanging on the implement head 26. Control means are desirably provided to enable one or other of the clutch mechanisms to be selected.

In use of this embodiment, the apparatus operates similarly to that of the second embodiment with the exception that the clutch mechanisms have been included to provide a choice of speeds to give a different hole pattern in the ground, and the front wheel castor arrangements provide easier manouverability. Also, the rapid transmission arrangement assists in allowing the apparatus to be moved from one area to another area, such as for example between greens on a golf course.

In a modification of all embodiments, the plunger 28 may be mounted below the lever 18 with the lever 18 connected adjacent to the top of the respective implement head 26.

Alternatively, tubes (not shown) can be fitted to the tops of the tines, the tubes exiting to a container mounted on the rear of the body, or a suction head may be provided rearwardly of the body 10 to collect the cores. The cores once collected can be pulverised and mixed with fertiliser to serve as top dressing to be scattered over the spiked ground.

Other modifications are possible and the above described arrangement of crank pins illustrates that two, three, four, five of six levers 18 can be fitted to the apparatus as shown in FIGS. 7A to 7E. Any number of crank pins and levers in any sequence can be fitted to the apparatus. Also, the combined vertical and horizontal motions can be imparted by use of a conventional crankshaft or some form of cam mechanism.

The apparatus can be used as a tractor mounted unit comprising a P.T.O. shaft drive from the tractor to a gear box in place of the engine. The open bottomed body 10 would be attached to the tractor via a hydraulically operated three point linkage. For example, a double version of the four lever arrangement i.e. using eight levers with two sets of chains and sprocket wheels transmitting power from a top mounted tractor driven gear box. A heavier version of the apparatus can be used for aeration purposes of argicultural grassland.

Figure 11:
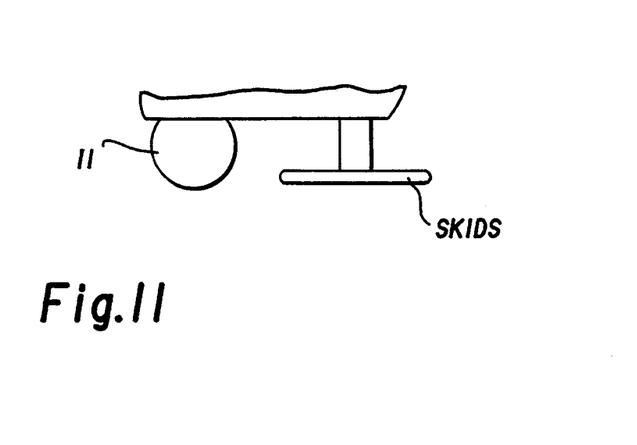
FIG. 11 is a side view of an embodiment of the apparatus wherein the support arrangement at a trailing end comprises skids.

An inexpensive domestic version of the apparatus can be made featuring a crankshaft with two crank pins encased in a narrower body. This could feature only two front wheel arrangements and instead of the rear wheel arrangements and lifting mechanism two ground engaging skids or ski shaped bars can be provided attached to the body as shown in FIG. 11. The apparatus would simply be lifted or tilted by the operating handle onto the front wheel arrangements and transported like a wheel barrow.

The advantages would be a less expensive apparatus for the domestic user using the same means and mechanisms as hereinbefore described and giving a professional result.

Figure 10:
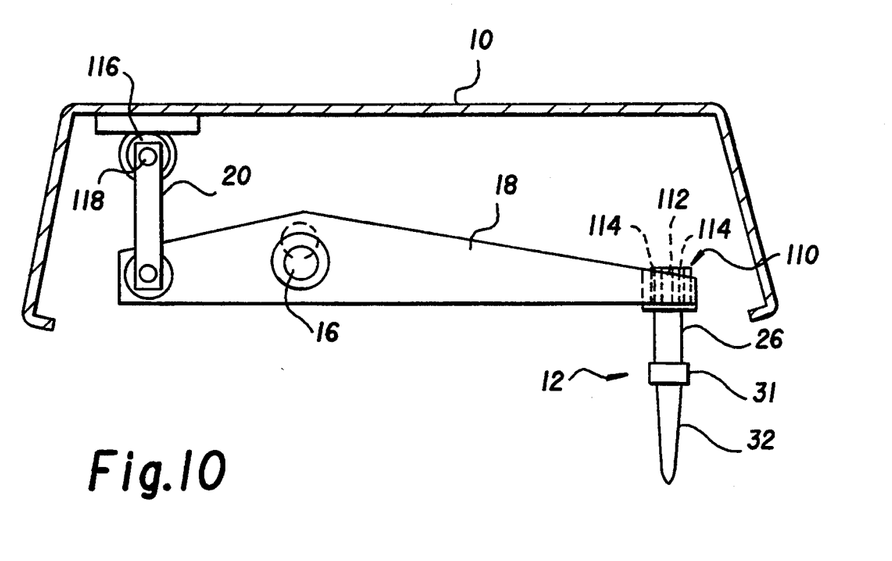
FIG. 10 is a schematic side elevational view of the apparatus with the nearest lateral side of the support body cut-away for clarity and showing only the modified driving means.

In a further modification of the three embodiments and as shown in FIG. 10, the biasing means is a block 110 of resilient material having a central vertical bore 112 into which the treatment implement hood 26 passes and is secured. The block of material of rubber or synthetic equivalent has two secondary bores 114 diametrically opposed relative to the central bore 112 and aligned horizontally with a forward-rearward axis to influence movement of the implement hood 26 along said axis. The block 110 is formed of an inner bonical bush and an outer bush having a complementary shaped conical slating for said conical bush between which a layer of resilient material is sandwiched. The block acts also as a shock/impact obsorber between the treatment implement and the lever. Also, in a further modification, of the three embodiments, the first end of the connection link 20 is pivotally connected to a bore 116 of resilient material, i.e. rubber or synthetic equivalent, secured to the support body 10. The boss 116 has a bore on a horizontal side-to-side axis into which a pin 118 from the connecting link 20 passes and is secured. The boss is formed of two concentric bushings having a layer of resilient material sandwiched therebetween. The boss also acts as a shock/impact absorber. By using the last two modifications for each arm lever, a robust relatively maintenance free, driving means is provided.

I claim:

1. A ground treatment apparatus, comprising:
   a support body having an open bottom;
   at least one treatment implement supported by said support body and being movable through said open bottom of said support body, said at least one treatment implement having an implement head extending vertically;
   driving means carried by said support body for driving said treatment implement in a cyclical path relative to said support body, said cyclical path including both vertical and horizontal movement; said driving means including (a) a connecting link having a first end and a second end, said first end being pivotably connected to said support body; (b) an arm lever having a central portion, a first end pivotably connected to said second end of said connecting link, and a second end connected to said at least one treatment implement; (c) a drive mechanism pivotably connected to said central portion of said arm lever for cyclically driving said arm lever in a substantially circular motion;
   biasing means for biasing said implement to a substantially vertical disposition when said implement is stationary with respect to said support body;
   the support body being supported off the ground by ground-engaging support arrangements at leading and trailing ends, respectively, of the support body; the support arrangements being mounted on the body in an adjustable manner whereby the body is tiltable from a first position whereat the treatment implements can penetrate the ground, to a second position whereat all of the treatment implements are precluded from engaging the ground; and
   position-changing means for movement of the body between first and second positions and vice versa comprises an elongate handle manipulatable lengthwise between said first and second positions, the handle having a transverse groove engagable in the second position around a transverse pin of a locking mechanism, and a projection engagable in the first position against said pin.

2. Apparatus according to claim 1, wherein the at least one treatment implement is a ground spiking device.

3. Apparatus according to claim 1, wherein a plurality of treatment implements are provided in a lateral array.

4. Apparatus according to claim 3, wherein the treatment implements are mounted on the driving means out of phase with each other.

5. Apparatus according to claim 4, wherein the driving means comprises a drive mechanism and a series of arm levers carried thereon to impart combined vertical and horizontal oscillations to the implements.

6. Apparatus according to claim 5, wherein a reaction of the treatment implements with the ground through the horizontal oscillations of the devices propels the apparatus thereacross.

7. Apparatus according to claim 5, wherein the support arrangements are wheel arrangements, and a transmission drive is provided from the drive mechanism to operate the wheel arrangements at the trailing end of the body.

8. Apparatus according to claim 5, wherein the drive mechanism, on rotation, imparts eccentric motion to the levers.

9. Apparatus according to claim 8, wherein the drive mechanism is a crankshaft having a series of crank pins.

10. Apparatus according to claim 9, wherein the crankshaft is assembled from similar cylindrical segments bolted together, and center line segments of the crankshaft each are provided with a rabbet to receive an adjoining crank pin.

11. Apparatus according to claim 10, wherein axes of the crank pins are out of phase with each other.

12. Apparatus according to claim 1, wherein power means is provided to operate the driving means.

13. Apparatus according to claim 12, wherein a power transmission arrangement is provided to transfer motion from the control power means to the driving means.

14. Apparatus according to claim 13, wherein a rapid transport transmission arrangement is provided to the rear wheel arrangements by-passing the driving means.

15. Apparatus according to claim 1, wherein the support body is substantially rectangular in plan.

16. Apparatus according to claim 1, wherein two clutch mechanisms are provided to permit different spiking patterns to be selected for use.

17. Apparatus according to claim 16, wherein control means are provided to enable one or the two clutch mechanisms to be selected.

18. Apparatus according to claim 1, wherein the ground-engaging support arrangements are wheel arrangements at the leading end and skid arrangements at the trailing end.

19. Apparatus according to claim 1, wherein the handle extends through the body and is pivotally connected to a beam united with at least two spaced brackets pivoted on a cross shaft, the brackets carrying on the opposite side of the cross shaft from the beam ground-engaging support arrangements.

20. Apparatus according to claim 1, wherein the locking mechanism is carried on a lift bar secured to the body in a parallel attitude to said handle, the locking mechanism comprising said transverse pin and a biasing mechanism to hold the groove of the handle in engagement with said pin.

21. Apparatus according to claim 20, wherein the biasing mechanism comprises a pivotal toggle, one end of which has a spring bearing against it and its other end having a roller in contact with the handle.

22. Apparatus according to claim 1, wherein the implement head extends upwardly above the arm lever and the biasing means is a spring plunge pivotally connected at the end to said arm lever and pivotally connected at another end thereof to said implement head.

23. Apparatus according to claim 22, wherein the first end of the connecting link is pivotally connected to a boss of resilient material secured to the support body.

24. Apparatus according to claim 1, wherein the biasing means is a block of resilient material having a central vertical bore into which the implement head passes and is secured.

25. Apparatus according to claim 24, wherein the block of material has two secondary bores diametrically opposed relative to the central bore and aligned with a forward-rearward axis to influence movement of the implement head along said axis.

* * * * *